(12) United States Patent
Barritt

(10) Patent No.: US 10,879,999 B2
(45) Date of Patent: *Dec. 29, 2020

(54) TEMPOROSPATIAL SOFTWARE-DEFINED NETWORKING FOR NGSO SATELLITE NETWORKS

(71) Applicant: LOON LLC, Mountain View, CA (US)

(72) Inventor: Brian Barritt, San Jose, CA (US)

(73) Assignee: Loon LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/444,620

(22) Filed: Jun. 18, 2019

(65) Prior Publication Data

US 2019/0372658 A1 Dec. 5, 2019

Related U.S. Application Data

(63) Continuation of application No. 15/954,922, filed on Apr. 17, 2018, now Pat. No. 10,374,695.
(Continued)

(51) Int. Cl.
*H04B 10/118* (2013.01)
*H04B 7/185* (2006.01)
(Continued)

(52) U.S. Cl.
CPC ....... *H04B 7/18584* (2013.01); *H04B 7/1851* (2013.01); *H04B 7/18504* (2013.01);
(Continued)

(58) Field of Classification Search
None
See application file for complete search history.

(56) References Cited

U.S. PATENT DOCUMENTS 5,590,395 A 12/1996 Diekelman
6,339,587 B1 1/2002 Mishra
(Continued)

FOREIGN PATENT DOCUMENTS

CN 106059650 A 10/2016
CN 106059960 A 10/2016
(Continued)

OTHER PUBLICATIONS

Barritt et al., Operating a UAV Mesh & Internet Backhaul Network using Temporospatial SDN, 2017 IEEE Aerospace Conference, 7 pages.
(Continued)

*Primary Examiner* — Li Liu
(74) *Attorney, Agent, or Firm* — Botos Churchill IP Law

(57) ABSTRACT

The disclosure provides for a system that includes a network controller. The network controller is configured to receive information from nodes of a network, where nodes include one node that is in motion relative to another node. The network controller is also configured to generate a table representing nodes, available storage at each node, and possible links in the network over a period of time based on the information, and determine a series of topologies of the network based on the table. Based on received client data including a data amount, the network controller is configured to determine flows for the topology. The network controller then is configured to generate a schedule of network configurations based on the flows, and send instructions to the nodes of the network for implementing the network configurations and transmitting client data.

20 Claims, 10 Drawing Sheets

Related U.S. Application Data

(60) Provisional application No. 62/511,377, filed on May 26, 2017.

(51) Int. Cl.

| | | |
|---|---|---|
| *H04L 12/751* | (2013.01) | |
| *H04L 12/947* | (2013.01) | |
| *H04L 12/721* | (2013.01) | |
| *H04L 12/717* | (2013.01) | |
| *H04L 12/937* | (2013.01) | |
| *H04L 12/24* | (2006.01) | |
| *H04L 12/755* | (2013.01) | |
| *H04B 10/112* | (2013.01) | |
| *H04B 7/195* | (2006.01) | |

(52) U.S. Cl.
CPC ..... *H04B 7/18508* (2013.01); *H04B 7/18521* (2013.01); *H04B 7/18589* (2013.01); *H04B 10/118* (2013.01); *H04B 10/1123* (2013.01); *H04L 41/12* (2013.01); *H04L 45/02* (2013.01); *H04L 45/021* (2013.01); *H04L 45/127* (2013.01); *H04L 45/38* (2013.01); *H04L 45/42* (2013.01); *H04L 49/252* (2013.01); *H04L 49/254* (2013.01); *H04B 7/195* (2013.01)

(56) References Cited

U.S. PATENT DOCUMENTS

| | | |
|---|---|---|
| 7,433,332 B2 | 10/2008 | Golden |
| 7,502,382 B1 * | 3/2009 | Liu .................. H04B 7/18521 370/225 |
| 7,889,677 B1 | 2/2011 | Foldvik |
| 8,068,053 B1 | 11/2011 | Stutzke |
| 8,116,632 B2 * | 2/2012 | Miniscalco .......... H04B 10/112 398/118 |
| 8,194,569 B2 | 6/2012 | Shorty et al. |
| 8,543,944 B2 | 9/2013 | Dwyer |
| 8,913,894 B2 | 12/2014 | Coleman et al. |
| 8,989,586 B2 * | 3/2015 | Arnold .......................... 370/316 |
| 9,042,734 B2 | 5/2015 | Makowski et al. |
| 9,083,425 B1 * | 7/2015 | Frolov .................. G05D 1/104 |
| 9,258,765 B1 | 2/2016 | Dacosta |
| 9,270,372 B2 * | 2/2016 | Miniscalco ........ H04B 10/1129 |
| 9,369,198 B2 * | 6/2016 | Beals ................. H04B 7/18521 |
| 9,369,200 B1 | 6/2016 | Schmidtke et al. |
| 9,438,341 B2 * | 9/2016 | Brumley, II ......... H04B 10/118 |
| 9,461,877 B1 | 10/2016 | Nadeau et al. |
| 9,503,176 B2 | 11/2016 | Beals et al. |
| 9,924,441 B1 | 3/2018 | Barritt |
| 10,177,985 B2 | 1/2019 | Mandle et al. |
| 10,374,695 B2 * | 8/2019 | Barritt .................. H04L 45/021 |
| 10,581,523 B2 | 3/2020 | Barritt |
| 2008/0016213 A1 | 1/2008 | Akinaga et al. |
| 2008/0159316 A1 | 7/2008 | Dutta |
| 2008/0162839 A1 | 7/2008 | Nakamichi et al. |
| 2009/0279433 A1 | 11/2009 | Briscoe |
| 2011/0126041 A1 | 5/2011 | Matsubara |
| 2011/0243024 A1 | 10/2011 | Osterling et al. |
| 2013/0177321 A1 | 7/2013 | Devaul |
| 2013/0238784 A1 * | 9/2013 | Teller .................. H04B 10/118 709/224 |
| 2013/0290520 A1 | 10/2013 | Noo et al. |
| 2014/0207923 A1 | 7/2014 | Jokinen et al. |
| 2014/0254592 A1 | 9/2014 | Olofsson et al. |
| 2014/0293787 A1 | 10/2014 | Bourdelles |
| 2016/0021597 A1 | 1/2016 | Hart |
| 2016/0037434 A1 * | 2/2016 | Gopal .................... H04L 45/02 370/316 |
| 2016/0050013 A1 * | 2/2016 | Brownjohn ........ H04B 7/18508 370/316 |
| 2016/0197668 A1 | 7/2016 | Alcorn |
| 2016/0205560 A1 | 7/2016 | Hyslop |
| 2018/0013624 A1 | 1/2018 | Miller et al. |
| 2018/0041400 A1 | 2/2018 | Ngoo et al. |

FOREIGN PATENT DOCUMENTS

| | | |
|---|---|---|
| EP | 2833298 A1 | 4/2015 |
| EP | 2985926 A1 | 2/2016 |
| JP | H07193868 A | 7/1995 |
| JP | H10341196 A | 12/1998 |
| WO | 2012114296 A1 | 8/2012 |

OTHER PUBLICATIONS

Brian Barritt and Wesley Eddy, SDN Enhancements for LEO Satellite Nelworks, 34th AIM International Communications Satellite Systems Conference, International Communications Satellite Systems Conferences (ICSSC), Oct. 2016, 10 pages.

Brian J. Barritt and Wesley M. Eddy, Temporospatial SDN for Aerospace Communicatons, AIAA SPACE 2015 Conference and Exposition, AIAA SPACE Forum, 5 pages.

International Search Report and Written Opinion for Application No. PCT/US2018/029385, dated Aug. 13, 2018.

Wiikipedia, "Forwarding information base (FIB)" [online], [Retrieved May 24, 2017], Retrieved from the Internet: https://en.Wikipedia.org/wiki/Forwarding_information_base. 4 pages.

Australian Office Action for Application No. AU2018258169 dated Jun. 22, 2020.

Singapore Search Report and Written Opinion for Application No. SG11201909354X dated Jun. 6, 2020.

Japanese Office Action for Application No. JP2019-556223 dated Oct. 26, 2020.

* cited by examiner

200

|  |  | Ground station 107a | Ground station 107b | HAP 110a | HAP 110b | HAP 110c | HAP 110d |
|---|---|---|---|---|---|---|---|
| Current time | Availablility | Available | Available | Available | Available | Unavailable | Available |
|  | Location |  |  | Location A |  | Location C | Location D |
|  | Weather |  |  | Clear weather |  | Clear weather |  |
|  | Available Storage |  |  |  |  |  | 10 Gb available |
| Future time | Availablility | Available | Available | Available | Available | Unavailable | Available |
|  | Location |  |  |  | Location B |  | Location E |
|  | Weather |  |  |  | Thunderstorm |  |  |
|  | Available Storage |  |  |  |  |  | 10 Gb available |

|  |  | Link 130 | Link 131 | Link 132 | Link 133 | Link 134 | Link 135 | Link 136 | Link 137 |
|---|---|---|---|---|---|---|---|---|---|
| Current time | Availablility | Available | Available | Available | Unavailable | Unavailable | Available | Available | Available |
|  | Location | High bandwidth | High bandwidth | Low bandwidth |  |  | Low bandwidth | Low bandwidth | High bandwidth |
| Future time | Availablility | Unavailable | Unavailable | Unavailable | Unavailable | Available | Available | Available | Available |
|  | Bandwidth | High bandwidth | High bandwidth | Low bandwidth |  | High bandwidth | Low bandwidth | Low bandwidth | High bandwidth |

TEMPOROSPATIAL SOFTWARE-DEFINED NETWORKING FOR NGSO SATELLITE NETWORKS

CROSS-REFERENCE TO RELATED APPLICATIONS

The present application is a continuation of U.S. application Ser. No. 15/954,922 filed Apr. 17, 2018, which application claims the benefit of the filing date of U.S. Provisional Patent Application No. 62/511,377 filed May 26, 2017, the disclosures of which are hereby incorporated herein by reference.

BACKGROUND

Information can be transmitted over directional point-to-point networks, such as aerospace and other mobile networks. In such networks, links can be formed between pairs of nodes by aiming transceivers of each node pair towards each other. In some implementations, nodes may include non-geostationary satellite orbit (NGSO) satellites or other high-altitude platforms (HAPs) that are in motion relative to the Earth.

BRIEF SUMMARY

One aspect of the disclosure provides a system including a network controller. The network controller is configured to receive information from a plurality of nodes of a network, the plurality of nodes including a first node that is in motion relative to a second node; generate a table representing nodes, available storage at each node, and possible links in the network over a period of time based on the received information; determine a series of topologies of the network over the period of time based on the generated table; receive client data information from one or more client devices, the client data information including a data amount; determine a plurality of flows for the determined series of topologies based on at least the data amount and the available storage at each node, each of the plurality of flows comprising one or more requirements for a routing path through the network; generate a schedule of network configurations for the determined series of topologies based on the determined plurality of flows; and send instructions to the plurality of nodes of the network for implementing the schedule of network configurations and transmitting client data over the period of time.

In one example, the system also includes the plurality of nodes. In another example, the plurality of nodes includes one or more ground stations and one or more high-altitude platforms. In another example, the plurality of nodes are configured to perform free-space optical communication. In another example, the schedule of network configurations includes a first network configuration, a second network configuration scheduled to follow the first network configuration, a first routing path having a first portion between a first node and a second node and a second portion between the second node and a third node, and the first portion of the first routing path being a part of the first network configuration and the second portion of the first routing path being a part of the second network configuration. In addition, the second node has enough available storage to store the data amount, and the second portion of the first routing path beings at the second node and the second node is configured to store the client data before transmitting the client data via the second portion of the routing path. In addition, the second network configuration includes a newly established link between the second node and a next hop in the second portion of the routing path, and the second node is in motion relative to the next hop in the second portion of the routing path. In addition or alternatively, the network controller is also configured to determine that there are no routes between the first node and the third node in each topology in the series of topologies and generate the schedule of network configurations in response to determining that there are no routes between the first node and the third node in each topology in the series of topologies. In another example, the network controller is configured to determine a plurality of flows for the determined series of topologies based on at least the data amount and the available storage at each node by identifying a given node having enough available storage to store the data amount and determining at least one flow including the given node in which the given node is used to store the client data for a period of time in the at least one flow.

Another aspect of the disclosure provides a method. The method includes receiving, by a network controller for a network, information from a plurality of nodes of the network, the plurality of nodes including a first node that is in motion relative to a second node; generating, by the network controller, a table representing nodes, storage capacity of each node, and possible links in the network over a period of time based on the received information; determining, by the network controller, a series of topologies of the network over the period of time based on the generated table; receiving, by the network controller, client data information from one or more client devices, the client data information including a data amount; determining, by the network controller, a plurality of flows for the determined series of topologies based on at least the data amount and the storage capacity of each node, each of the plurality of flows comprising one or more requirements for a routing path through the network; generating, by the network controller, a schedule of network configurations for the determined series of topologies based on the determined plurality of flows; and sending, by the network controller, instructions to the plurality of nodes of the network for implementing the schedule of network configurations and transmitting client data over the period of time.

In another example, the schedule of network configurations includes a first network configuration, a second network configuration scheduled to follow the first network configuration, a first routing path having a first portion between a first node and a second node and a second portion between the second node and a third node, the first portion of the first routing path being a part of the first network configuration and the second portion of the routing path being a part of the second network configuration. In this example, the second node has enough available storage to store the data amount, and the second portion of the first routing path beings at the second node, and the second node is configured to store the client data before transmitting the client data via the second portion of the routing path. In addition, the second network configuration includes a newly established link between the second node and a next hop in the second portion of the routing path, and the second node is in motion relative to the next hop in the second portion of the routing path. In addition or alternatively, the method also includes determining, by the network controller, that there are no routes between the first node and the third node in each topology in the series of topologies; and generating, by the network controller, the schedule of network configurations in response to determining that there are no routes between the first node and the third node in each topology in the series of topologies. In another example, determining a plurality of flows for the determined series of topologies based on at least the data amount and the available storage at each node includes identifying a given node having enough available storage to store the data amount; and determining at least one flow including the given node in which the given node is used to store the client data for a period of time in the at least one flow.

A further aspect of the disclosure provides a non-transitory, tangible computer-readable storage medium on which computer readable instructions of a program are stored, the instructions, when executed by a network controller for a network, cause the network controller to perform a method. The method includes receiving information from a plurality of nodes of the network, the plurality of nodes including a first node that is in motion relative to a second node; generating a table representing nodes, storage capacity of each node, and possible links in the network over a period of time based on the received information; determining a series of topologies of the network over the period of time based on the generated table; receiving client data information from one or more client devices, the client data information including a data amount; determining a plurality of flows for the determined series of topologies based on at least the data amount and the storage capacity of each node, each of the plurality of flows comprising one or more requirements for a routing path through the network; generating a schedule of network configurations for the determined series of topologies based on the determined plurality of flows; and sending instructions to the plurality of nodes of the network for implementing the schedule of network configurations and transmitting client data over the period of time.

In one example, the schedule of network configurations includes a first network configuration, a second network configuration scheduled to follow the first network configuration, a first routing path having a first portion between a first node and a second node and a second portion between the second node and a third node, the first portion of the first routing path being a part of the first network configuration and the second portion of the routing path being a part of the second network configuration. In this example, the second node has enough available storage to store the data amount, and the second portion of the first routing path beings at the second node, and the second node is configured to store the client data before transmitting the client data via the second portion of the first routing path.

BRIEF DESCRIPTION OF THE DRAWINGS

FIGS. 4A and 4B are an example table 400 in accordance with aspects of the disclosure.

DETAILED DESCRIPTION

Overview

The technology relates to a Temporospatial Software-Defined Networking (TS-SDN) operating system configured for use in an aerospace communication network. Particularly, the TS-SDN operating system may be used in aerospace communication networks that include non-geostationary satellite orbit (NGSO) satellites or other high-altitude platforms (HAPs) as nodes. Due to the movement of nodes relative to one another in the network, a given node may be in communication with another node at a first point in time, and be out of range of the other node at a second point in time. The TS-SDN operating system may schedule and implement the services and applications that control, monitor, and reconfigure the network layer and switching functionality to account for such changes in the communication ranges of the nodes.

In operation, a TS-SDN controller may periodically update a list of available nodes, such as, for example, NGSO satellites configured for free-space optical communication (FSOC), and available flows and routes through the aerospace network. The list may include a schedule of the available nodes and available flows. The available routes may be based in part on available storage at each of the nodes. The TS-SDN controller may automatically schedule the tasking of FSOC terminals and transmit the schedule to the FSOC terminals to synchronize changes to the aerospace network according to the schedule.

Example Systems

Figure 1:
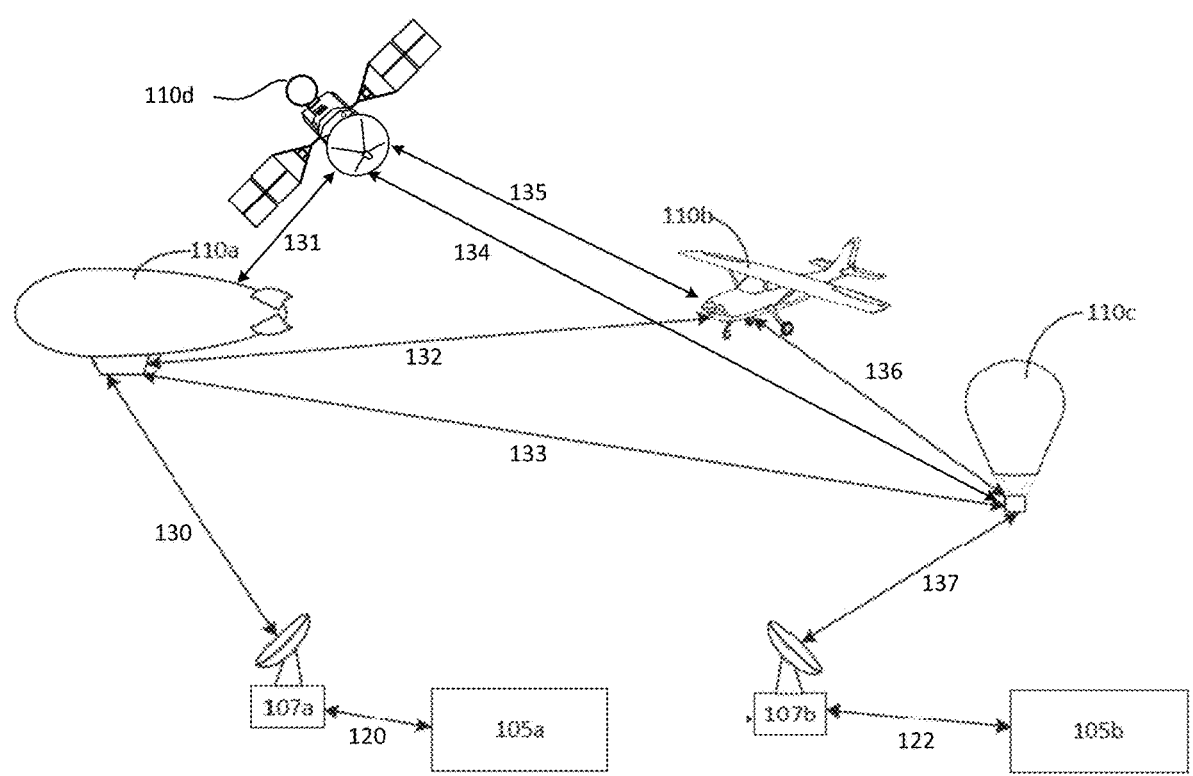
FIG. 1 is a pictorial diagram of an example directional point-to-point network 100 in accordance with aspects of the disclosure.

FIG. 1 is a block diagram of an example directional point-to-point network 100. The network 100 is a directional point-to-point computer network consisting of nodes mounted on various land- and air-based devices, some of which may change position with respect to other nodes in the network 100 over time. For example, the network 100 includes nodes associated with each of two land-based datacenters 105a and 105b (generally referred to as datacenters 105), nodes associated with each of two ground stations 107a and 107b (generally referred to as ground stations 107), and nodes associated with each of four airborne high altitude platforms (HAPs) 110a-110d (generally referred to as HAPs 110). As shown, HAP 110a is a blimp, HAP 110b is an airplane, HAP 110c is a balloon, and HAP 110d is a satellite. In some embodiments, nodes in network 100 may be equipped to perform FSOC, making network 100 an FSOC network. Additionally or alternatively, nodes in network 100 may be equipped to communicate via radio-frequency signals or other communication signal capable of travelling through free space. Arrows shown between a pair of nodes represent possible communication links 120, 122, 130-137 between the nodes. The network 100 as shown in FIG. 1 is illustrative only, and in some implementations the network 100 may include additional or different nodes. For example, in some implementations, the network 100 may include additional HAPs, which may be balloons, blimps, airplanes, unmanned aerial vehicles (UAVs), satellites, or any other form of high altitude platform.

In some implementations, the network 100 may serve as an access network for client devices such as cellular phones, laptop computers, desktop computers, wearable devices, or tablet computers. The network 100 also may be connected to a larger network, such as the Internet, and may be configured to provide a client device with access to resources stored on or provided through the larger computer network. In some implementations, HAPs 110 can include wireless transceivers associated with a cellular or other mobile network, such as eNodeB base stations or other wireless access points, such as WiMAX or UMTS access points. Together, HAPs 110 may form all or part of a wireless access network. HAPs 110 may connect to the datacenters 105, for example, via backbone network links or transit networks operated by third parties. The datacenters 105 may include servers hosting applications that are accessed by remote users as well as systems that monitor or control the components of the network 100. HAPs 110 may provide wireless access for the users, and may forward user requests to the datacenters 105 and return responses to the users via the backbone network links.

Figure 2:
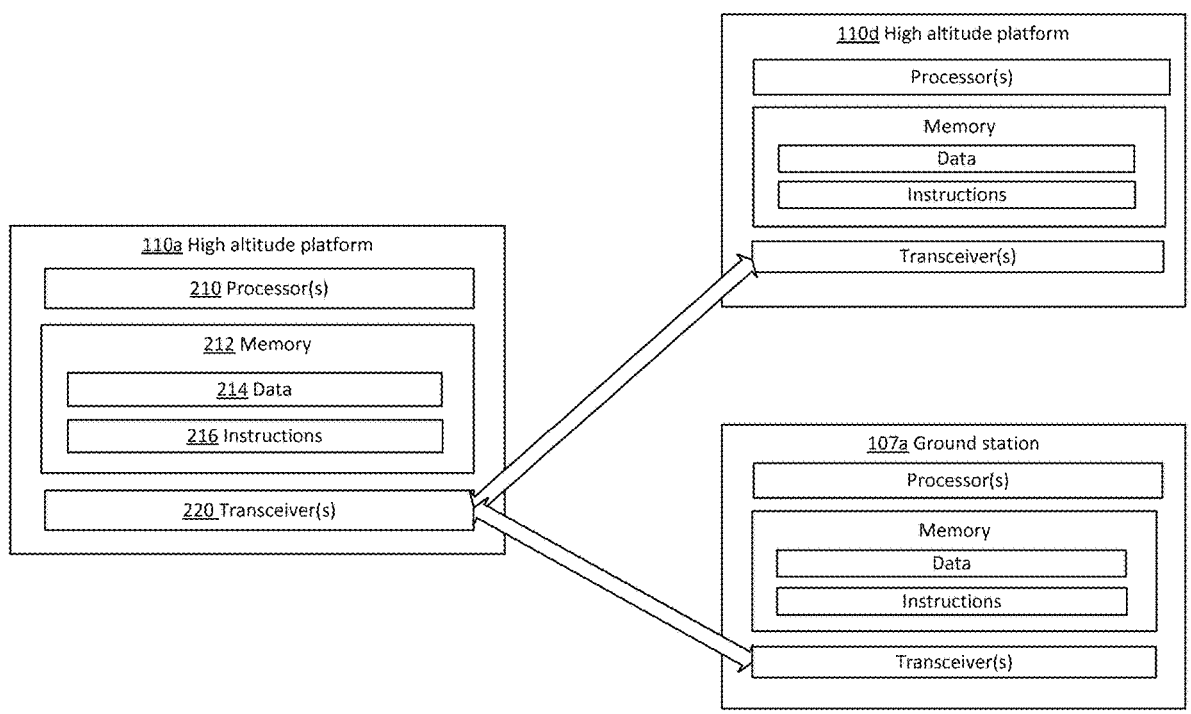
FIG. 2 is a functional diagram of a portion 200 of the network 100 shown in FIG. 1 in accordance with aspects of the disclosure.

As shown in FIG. 2, each node, such as ground stations 107 and HAPs 110 may include one or more transceivers configured to create one or more links, such as links 130-137, between a given HAP 110 and another node in the network. Referring to HAP 110a, each of the nodes, such as ground stations 107 and HAPs 110 of network 100, may include one or more processors 210, memory 212, and one or more transceivers 220. For the sake of clarity and simplicity, only ground station 107a and HAPs 110a, 110d are shown in FIG. 2. However, other ground stations and HAPs in the network may have the same or as similar configuration as ground station 107 or HAPS 110a, 110d.

The one or more processors 210 may be any conventional processors, such as commercially available CPUs. Alternatively, the one or more processors may be a dedicated device such as an application specific integrated circuit (ASIC) or other hardware-based processor, such as a field programmable gate array (FPGA). Although FIG. 2 functionally illustrates the one or more processors 210 and memory 212 as being within the same block, it will be understood that the one or more processors 210 and memory 212 may actually comprise multiple processors and memories that may or may not be stored within the same physical housing. Accordingly, references to a processor or computer will be understood to include references to a collection of processors or computers or memories that may or may not operate in parallel.

Memory 212 stores information accessible by the one or more processors 210, including data 214, and instructions 216, that may be executed by the one or more processors 210. The memory may be of any type capable of storing information accessible by the processor, including non-transitory and tangible computer-readable mediums containing computer readable instructions such as a hard-drive, memory card, ROM, RAM, DVD or other optical disks, as well as other write-capable and read-only memories. The system and method may include different combinations of the foregoing, whereby different portions of the data 214 and instructions 216 are stored on different types of media. In the memory of each node, such as memory 212 of HAP 110a, a forwarding information base or forwarding table may be stored that indicate how signals received at each node should be forwarded, or transmitted. For example, the forwarding table stored in memory 212 may indicate that a signal received from ground station 107a should be forwarded to HAP 110d.

Data 214 may be retrieved, stored or modified by the one or more processors 210 in accordance with the instructions 216. For instance, although the system and method is not limited by any particular data structure, the data 214 may be stored in computer registers, in a relational database as a table having a plurality of different fields and records, XML documents or flat files. The data 214 may also be formatted in any computer-readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data 214 may comprise any information sufficient to identify the relevant information, such as numbers, descriptive text, proprietary codes, references to data stored in other areas of the same memory or different memories (including other network locations) or information that is used by a function to calculate the relevant data.

The instructions 216 may be any set of instructions to be executed directly (such as machine code) or indirectly (such as scripts) by the one or more processors 210. For example, the instructions 216 may be stored as computer code on the computer-readable medium. In that regard, the terms "instructions" and "programs" may be used interchangeably herein. The instructions 216 may be stored in object code format for direct processing by the one or more processors 210, or in any other computer language including scripts or collections of independent source code modules that are interpreted on demand or compiled in advance. Functions, methods and routines of the instructions 216 are explained in more detail below.

The one or more transceivers 220 may be mounted to actuators that can be controlled, or steered, to point in a desired direction. To form a link between two nodes, such as the node associated with the HAP 110a and the node associated with the HAP 110d, the transceivers of the respective nodes can be controlled to point in the direction of one another so that data can be sent and received between the nodes. In some implementations, the power of the signals transmitted by each transceiver can also be controlled by the one or more processors of respective nodes to facilitate formation of the links 130-137 in the network 100 (see FIG. 1, for instance). For example, nodes that are separated by a relatively large distance can be configured to operate at a higher power to compensate for the reduction in signal-to-noise ratio that occurs over the distance separating the two nodes. Nodes that are spaced nearer to one another may be controlled to operate at a relatively lower power so as to save power.

Figure 3:
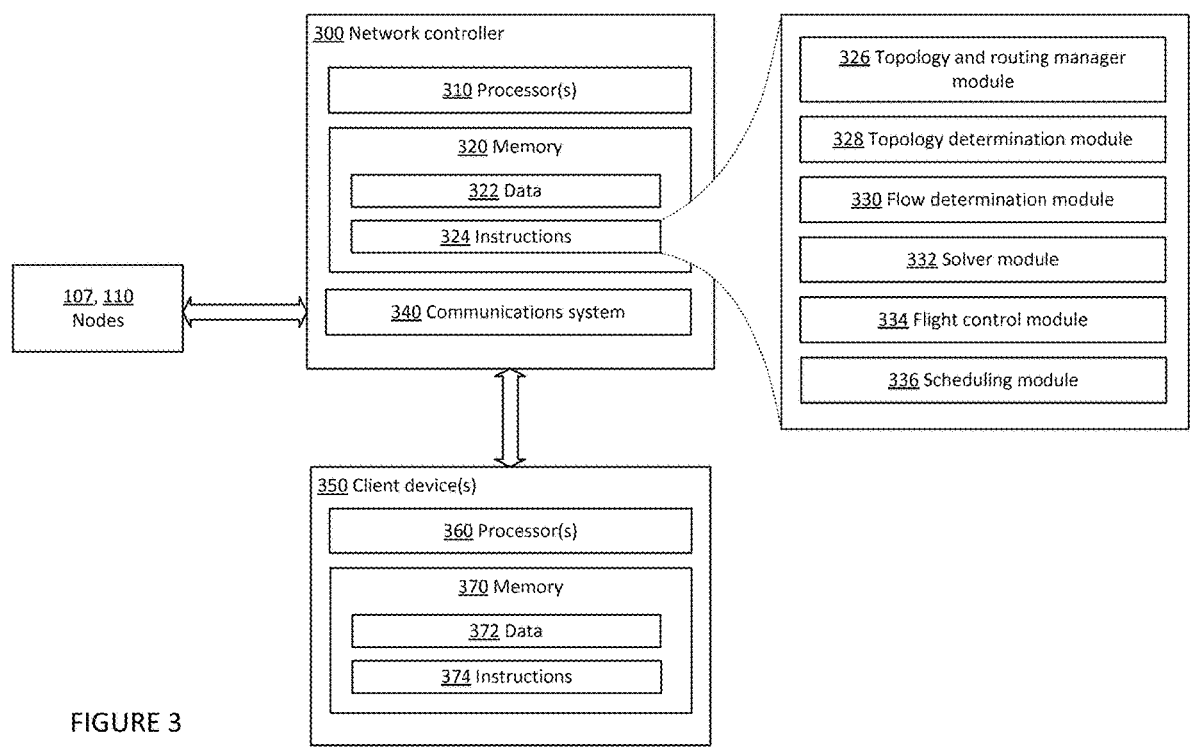
FIG. 3 is a functional diagram of a network controller 300 in accordance with aspects of the disclosure.

In some implementations, the network 100 can be an SDN that is controlled by an SDN controller, such as network controller 300 depicted in FIG. 3. The network controller 300 may be located at one of the network nodes or at a separate platform, such as, for example, in one of the datacenters 105. The nodes of the network 100 can be configured to communicate with one another using the steerable transceivers, such as the one or more transceivers 220. As the HAPs 110 move with respect to one another and with respect to the datacenters 105 and ground stations 107 over time, some of the links shown in the block diagram of FIG. 1 may become infeasible. For example, the link 130 between the ground station 107a and the HAP 110a may not be feasible when the path of the HAP 110a brings the HAP 110a into a position in which it is out of range of the ground station 107a, or in which the earth is positioned between it and the ground station 107a. Thus, due to the continuous movement of the HAPs 110, the topology of the network 100 may require regular (i.e. periodic) or irregular reconfiguration to maintain connectivity and to satisfy determined network flows.

FIG. 3 is a block diagram 300 of network controller 300. The network controller 300 may be configured to send control messages to the network 100 to configure the topology of the network 100, to pass routing information to the nodes 107, 110 of the network 100, and to schedule changes to the topology of the network 100 to transmit client data. As shown in FIG. 3, the network controller 300 may include one or more processors 310, memory, 320, and communications system 340. The one or more processors 310 may be similar to the one or more processors 210 described above.

Memory 320 may store information accessible by the one or more processors 310, including data 322 and instructions 324 that may be executed by processor 310. Memory 320, data 322, and instructions 324 may be configured similarly to memory 212, data 214, and instructions 216 described above. The data 322 may include a table representing all of the available nodes and possible links in the network 100 at a given time or time frame, such as table 400 in FIG. 4. The table 400 may have a column for every node and link in the network 100 and a row for a time or time frame. In some cases, the columns and the rows may be reversed. The table 400 may also store, for each node and each link, scheduled times or time frames during which the node or link is available. Alternatively, a graph or other form of information organization may be used. The instructions 324 may include a topology and routing manager module 326, a topology determination module 328, a flow determination module 330, a solver module 332, a flight control module 334, and a scheduling module 336.

Returning to FIG. 3, the communications system 340 may be configured to communicate with the nodes 107, 110 of network 100 as well as one or more client devices 350. In some embodiments, the communication system 340 includes a Control to Data-Plane Interface (CDPI) driver configured to communicate with a CDPI agent at each of the nodes 107, 110. In addition, the communications system 340 of the network controller 300 may include one or more northbound interface (NBI) agents configured to communicate with an NBI driver at each client device 350 associated with one or more SDN applications. The communication system 340 may optionally or alternatively be configured to transmit and receive a signal via radio frequencies, optical frequencies, optical fiber, cable, or other communication means to and from the nodes 107, 110 in the network 100 and the one or more client devices 350.

Each client device 350 may be a personal computing devices or a server with one or more processors 360, memory 370, data 372, and instructions 374 similar to those described above with respect to the one or more processors 210 and 310, memories 212 and 320, data 214 and 322, and instructions 216 and 324. Personal computing devices may include a personal computer that has all of the components normally used in connection with a personal computer such as a central processing unit (CPU), memory (e.g., RAM and internal hard drives) storing data and instructions, an electronic display (e.g., a monitor having a screen, a small LCD touch-screen, a projector, a television, or any other electrical device that is operable to display information), user input (e.g., a mouse, keyboard, touch-screen or microphone), camera, speakers, a network interface device, and all of the components used for connecting these elements to one another. Personal computing devices may also include mobile devices such as PDAs, cellular phones, and the like. Indeed, client devices 350 may include any device capable of processing instructions and transmitting data to and from humans and other computers including general purpose computers, network computers lacking local storage capability, and set-top boxes for televisions. In some embodiments, client devices may be associated with one or more SDN applications and may have one or more NBI drivers.

Turning to the modules of the instructions 324 of FIG. 3, the topology and routing manager module 326 may cause the one or more processors 310 to interface between the network controller 300 and the network 100. Using the topology and routing manager module 326, the one or more processors 310 may receive information from each of the nodes within the network 100. For example, in some implementations, the topology and routing manager module 326 may cause the one or more processors 310 to receive information from each node 107, 110 in the network 100 corresponding to the current location of each node, the predicted path of each node, the current links associated with each node, the routing information stored by each node, and the current storage capacity, for instance how many free or available bits can be utilized if any, at each node. Information received from each node may also include weather conditions, turbulence, radiation, or other reports regarding other conditions that may affect FSOC between nodes. Each node also may send to the one or more processors 310 information corresponding to any failed links, which may occur due to unforeseen obstructions between nodes, turbulence at a node, or failure of one or more transceivers.

The topology and routing manager module 326 may also cause one or more processors 310 to receive predicted link metrics and conditions. For example, a predicted link metric may include a predicted value of a network performance metric for a hypothetical link that may be formed currently or in the future based on information received from the nodes 107, 110. Network performance metrics may include bandwidth capacity, latency, or link lifetime duration, and can be based on the predicted relative motion or trajectory of the nodes 107, 110 in the network 100. Link lifetime duration may represent the period of time during which a link is feasible in the network 100. Weather forecasts in node locations, predicted node locations or predicted links may also be received by the one or more processors 310 from the nodes 107, 110 or optionally from a remote system.

Using the topology and routing manager module 326, the one or more processors 310 may store the information received from the network 100 in the memory 320. For instance, the table 400, depicted across FIGS. 4A and 4B, represents all of the available nodes (FIG. 4A) and possible links (FIG. 4B) in the network 100 may be updated or annotated with information relevant for a particular node or link in the table. The annotations of the table 400 may indicate availability of each node in the network 100, current and future locations of each node, current and future expected weather conditions, as well as a current amount of available storage at each of the nodes and a future (estimated) amount of available storage at each of the nodes in the network. In addition, the annotations of table may indicate the current and future availability of particular links as well as the current and future expected bandwidth for such links. Failed links and forecasted conditions may also be noted and stored in the table 400.

The topology determination module 328 may cause the one or more processors 310 to determine a current or future topology of the network 100. The determination of the current topology of the network 100 may be made based on the information received and stored by the one or more processors using the topology and routing manager module 326. For example, the topology determination module 328 may cause the one or more processors 310 to aggregate the information relating to the current location of each node 107, 110, the links 130-137 formed between each pair of nodes, the available storage at each node 107, 110, and any failed links that may exist within the network 100. The one or more processors 310 may receive this information through use of the topology and routing manager module 326, or may retrieve this information from the memory 320.

Additional information may also be used by the one or more processors 310 using the topology determination module 328 to determine the current topology of the network 100. Predicted link metrics received by the one or more processors 310 using the topology and routing manager module 326 and may also be used to determine the bandwidth, quality of service, and other characteristics of available links in the current topology. In some implementations, using the topology determination module 328, the one or more processors 310 may also receive information through using the flight control module 334 corresponding to the flight paths of the airborne network nodes, such as HAPs 110, at a particular time or over a particular time frame at or near the current time, and the determination of the current topology may be made based also on the received flight information.

To determine a future topology of the network 100, the one or more processors 310 may aggregate location information, predicted link conditions, flight information, available storage and/or weather forecasts related to a future time using the topology determination module 328. The one or more processor 310 may access the information stored in the table 400 or elsewhere in the memory 320 regarding available nodes and links at the future time, location information, predicted link conditions, flight information, and/or weather forecasts. The information for the future time may be used by the one or more processors 310 to determine where nodes are predicted to be and what the availability of nodes and links and storage capabilities at each node are predicted to be at the future time.

The topology determination module 328 may cause the one or more processors 310 to store the current or future topology or other topology information in the memory 320, such as by generating and or updating the table 400 representing all of the available nodes and possible links in the network 100 and the scheduled times or time frames associated with each node or link.

The flow determination module 330 may cause the one or more processors 310 to determine all of the flows that are determined in the network 100 at a given time or time frame. A given flow may be one or more requirements for a routing path through the network 100. For example, each flow may comprise a start station, an end station, a time frame, a minimum bandwidth, or other requirement for transmission. The one or more processors 310 may determine the flows based on the topology information determined using the topology determination module 328 and/or information regarding characteristics of client data of the one or more client devices 350. The client data information may be received by the one or more processors 310 using the scheduling module 336 as described below from the one or more client devices 350 or a remote system. The client data information may include the sources and destinations for client data, an amount of client data to be transmitted, and/or a timing for transmission of client data.

The minimum bandwidth of a flow may be preset or predetermined by the one or more processors 310 given available system resources and link capabilities or alternatively, may be determined based on requirements included in the client data. Larger bandwidths may be set for flows transporting larger amounts of data. The one or more processors 310 may determine a flow between a start station and a destination station through the network capable of transmitting the amount of client data at the requested time. In some embodiments, the one or more processors 310 may also determine other information related to determined flows, such as the class of service or quality of service for each determined flow. The other information may be based on requirements received from the client device.

In some implementations, the flow determination module 330 may cause the one or more processors 310 to aggregate the client data from the one or more client devices 350 to determine the total amount of bandwidth required between each node pair in the network 100. The aggregated client data may be stored, for example, in the memory 320. Furthermore, the client data may be aggregated at a granular level. For example, the network data for each pair of nodes may be aggregated by class of service, quality of service, or any other relevant network traffic discriminator. The flows may be determined further based on any relevant network traffic discriminator.

In other cases, historical client data trends may be used to predict the client data amounts, sources, and destinations at a future point in time. The flow determination module 330 may cause the one or more processors 310 to determine a plurality of available flows between every node directly connectable to a client device at the future point in time. Directly connectable nodes, such as ground stations 107, may be able to communicate with a client device without use of the network 100. The predicted client data amounts between each node pair may be used to determine the bandwidth requirements between each node pair.

Alternatively, in the absence of client data information, the one or more processors 310 may determine a plurality of available flows between every node directly connectable to a client device at the current or future time. The determination of the plurality of available flows may be based on the current or future topology. In addition, the determination may be based on minimum system requirements.

The flow determination module 330 may cause the one or more processors 310 to store the determined flows in the memory 320. In some examples, the one or more processors 310 may annotate the table with the flows.

The solver module 332 may cause the one or more processors 310 to generate a network configuration or a schedule of network configurations based on the table stored in the memory. The network configuration may represent a feasible network topology that is capable of satisfying all determined network flows and may include a list of nodes and links that would be in use in the feasible network topology and a schedule of when the nodes and links would be in use. The schedule of network configurations may represent a feasible series of network topologies that are capable of satisfying all determined network flows. The feasible series of network topologies may include a list of nodes and links and a schedule of when the nodes and links would be in use for each network configuration in the schedule of network configurations. In some examples, the feasible series of network topologies includes a network topology during which data may be stored at a node having available storage and a next network topology in which the node forms a new connection or link with another node and transmits the data via the newly established link.

The network configuration(s) may be generated by the one or more processors 310 based on the topology for a given point in time in the table and on the network performance metrics of the topology at the given point in time. Various network performance metrics, such as, for example, link bandwidth, link latency, flow bandwidth, flow priority, link switching time (i.e., the time required to implement a new topology in the network 100), link duration, and/or topology duration, may be modeled as weighted constraints for the topology at the given point in time. In some embodiments, one or more network performance metrics may not be included in the table stored in the memory, but may be received from another module, another node, or from a remote system.

The one or more processors 310 may also compute routing paths for the determined flows over the topology represented by the network configuration. A given routing path may be one way to implement a given flow that satisfies the determined flow requirements and may include specific nodes and links in the network, or a list of hops between a series of nodes. In some examples, the given routing path may include a node having available storage that satisfies the determined flow requirement regarding an amount of data to be transmitted through the network. Data following the given routing path may be stored at the node for a period of time before travelling to a next hop.

In addition, information corresponding to a previous state of the network and a previous network topology may also be used to determine the network configuration or the schedule of network configurations. For example, the one or more processors 310 may generate the network configuration based on at least in part a number of changes from the previous network topology required for the network to implement the network configuration and an amount of time required for the network to make the number of changes. The one or more processors 310 may alternatively generate the schedule of network configurations based on at least in part a number of changes between network topologies of the network configurations in the schedule of network configurations and the amount of time between changes utilizing the information of routing tales such as the table 400. For example, changes may include steering a transceiver to point in a new direction or changing a forwarding table stored at a memory of a node. Steering the transceiver may take more take than changing the forwarding table stored at the memory of the node. The generated network configuration may require a number of changes is below a threshold number and/or the amount of time below a threshold amount of time.

For some pairs of subsequent network configurations in the schedule of network configurations, the difference between the earlier network configuration and the later network configuration may be a single change that may not involve changing the direction of transceivers, such as a routing change at a single node.

After the one or more processors 310 has generated the network configuration(s) and routing paths using the solver module 332, the one or more processors 310 may control the nodes of the network 100 according to the topology and routing manager module 326 to implement the topology represented by the generated network configuration by sending implementation instructions to the nodes to cause the nodes to form the links included in the generated network configuration (e.g., by steering their respective transceivers, adjusting their respective transmission power levels, setting their transmission and reception frequency bands, etc.) and update forwarding tables stored at the memory at each node according to the computed routing paths for the determined flows. Some forwarding tables may be updated with a schedule of changes based on the schedule of network configurations and may also instructions to store data at a node before a next hop.

The flight control module 334 may cause the one or more processors 310 to generate flight instructions for the airborne nodes, such as HAPs 110, regarding the flight paths of the airborne nodes. For example, the one or more processors 310 may be unable to determine a network configuration using the solver module 332 representing a network topology that is capable of satisfying all of the determined network flows. The one or more processors may determine that the reasons for this failure using the solver module 332 is that one or more of the airborne network nodes in the network 100 has traveled too far from the other network nodes to be able to form a link. In response, using the flight control module 334, the one or more processor 310 may generate and transmit flight instructions for the airborne nodes of the network 100 that cause the airborne nodes to alter their flight paths such that additional links may be formed. For example, the flight instructions may cause the airborne nodes to move closer to one another or to avoid obstructions. After the nodes have been repositioned according to the flight instructions generated by the one or more processors using the flight control module 334, an updated table may be created using the topology and routing manager module 326 or the topology determination module 328 based on the new locations of the network nodes. Then, the updated table may be processed by the one or more processors 310 using the solver module 332 to determine a network configuration.

The scheduling module 336 may cause the one or more processors 310 at the network controller 300 to interface with the one or more client devices 350. Using the scheduling module 336, the one or more processors 310 may receive from a client device 350 client data information to be transmitted through the network 100, such as, for example, the sources and destinations for the client data. Other information received from the client device 350 may include data related to client demand, such as amount of client data to be transmitted and a timing for transmission. The information may be stored in memory 320 and/or used according to the flow determination module 330 to determine the determined flows through the network 100.

After the determined flows are determined using the flow determination module 330 and the network configuration is generated using the solver module 332 as described above, the one or more processors 310 may generate routing instructions for transmitting the client data through the network 100 based on the table and the generated network configuration. These routing instructions may include a source location of the client data, a destination location of the client data, and a timing for the transmission of the client data. In some embodiments, the routing instructions may include storage instructions to a node to temporarily store data from a previous node to be transmitted to a next node. The routing instructions may include a schedule that may be stored at a node of the network in directly connectable with the client device 350 sending the client data. The one or more processors 310 may then send the routing instructions to the node directly connectable with the client device 350 to cause the node to receive and initiate transmission of the client data over the determined flow in accordance with the schedule.

In some embodiments where flows are determined without client data information, the scheduling module 336 may cause the one or more processors 310 to send a message to a client device of the one or more client devices 350 regarding indicating availabilities of flows through the network based on the determined flows determined using the flow determination module 330 and the network configuration generated using the solver module 330. The message may also include a time or a time frame at which the flows are available and/or a price for transmission of the data associated with each flow. Using the schedule module 336, the one or more processors 310 may receive a response from one of the one or more client devices 350 that includes a request to use one of the determined flows for transmitting client data. The one or more processors 310 may then send routing instructions to the one or more nodes to initiate transmission of the client data over the determined flow.

Example Methods

Figure 5:
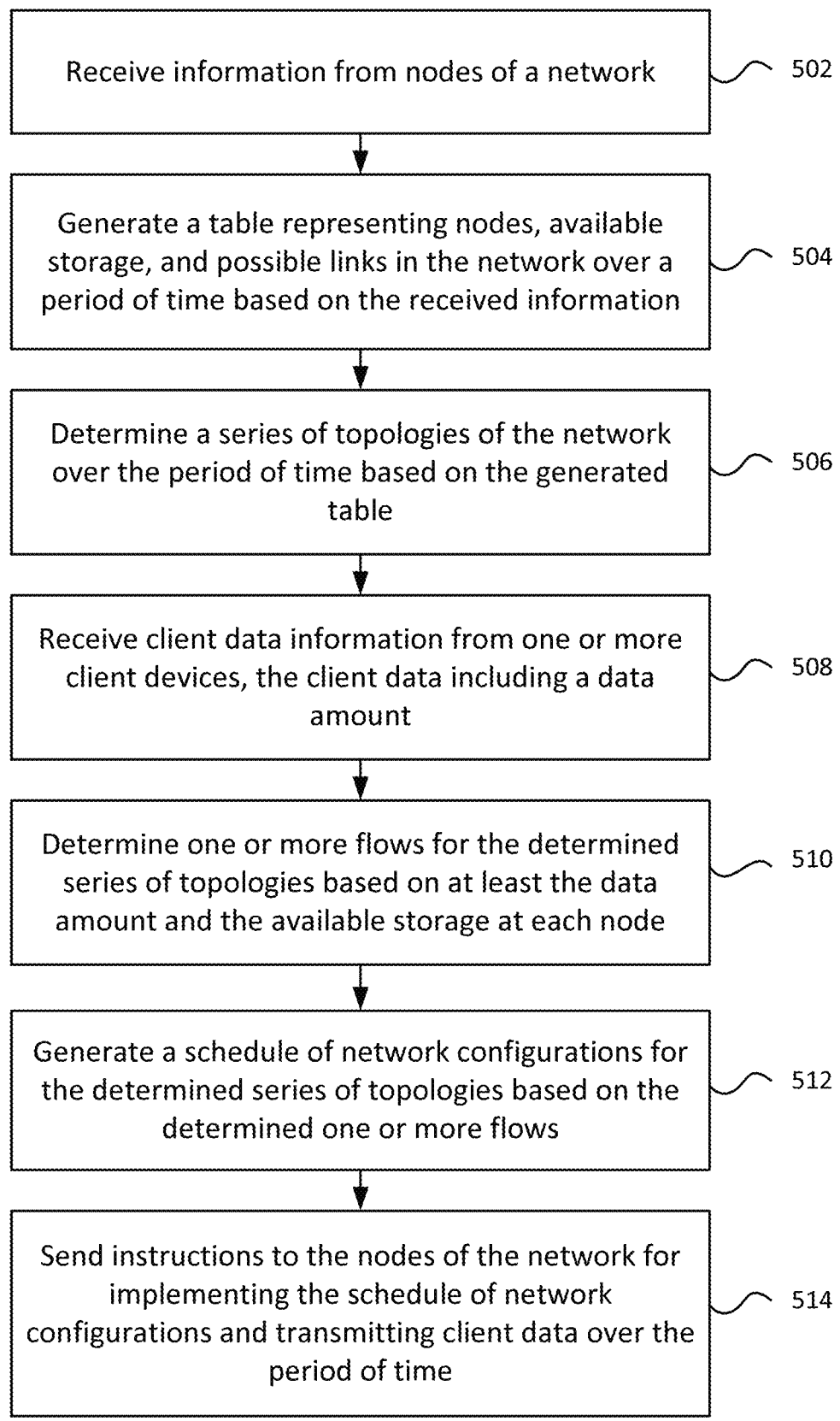
FIG. 5 is a flow diagram 500 of a method in accordance with aspects of the disclosure.

In FIG. 5, flow diagram 500 is shown in accordance with some of the aspects described above that may be performed by the one or more processors 310 of the network controller 300. While FIG. 5 shows blocks in a particular order, the order may be varied and that multiple operations may be performed simultaneously. Also, operations may be added or omitted.

At block 502, the one or more processors 310 of the network controller 300 may receive information from each of the nodes within the network 100 using the topology and routing manager module 326. Information may be related to the current or predicted condition of the nodes, weather, or links at a current time or a future time. In an example scenario, location A may be received as the current location of HAP 110a at a current time, location C may be received as the current location of HAP 110c at the current time, and location D may be received as the current location of HAP 110d. The weather conditions report from HAP 110a and 110c may indicate that the current weather conditions are clear at locations A and C. HAP 110d may also send an indication that there is available storage of 10 Gb at HAP 110d between at the current time. HAPs 110a and 110d may each send an indication to the one or more processors 310 that HAP 110c has been unresponsive to requests to for a link 133. In addition, HAP 110a may be predicted to travel from location A to location B in one hour from the current time, and HAP 110d may be predicted to travel from location D to location E in one hour from the current time. The weather forecast for location B in one hour from the current time may include a thunderstorm.

At block 504, a table representing available nodes and possible links in the network 100, such as table 400 shown in FIG. 4, may be generated or updated based on the information received from the nodes of the network using the topology and routing manager module 326. As noted above, the table may be stored in the memory 320. In the example scenario, for HAP 110a, the table may be generated or updated to indicate that HAP 110a is available at location A where the weather is currently clear, and that HAP 110a is predicted to be at location B in one hour, where the weather will include a thunderstorm at that time. For HAP 110c, the table 400 may be generated or updated to indicate that HAP 110c is currently located at location C. For HAP 110d, the table 400 may be generated or updated to indicate that HAP 110d is currently located at location D and is currently has 10 Gb of available storage, and that HAP 110d is predicted to be at location E in one hour. For the link 133 between HAPs 110a and 110c, the table may be generated or updated to indicate that the link 133 has failed. For the link 134 between HAPs 110b and 110c, the table may be generated or updated to indicate that the link 134 has failed.

Figure 6:
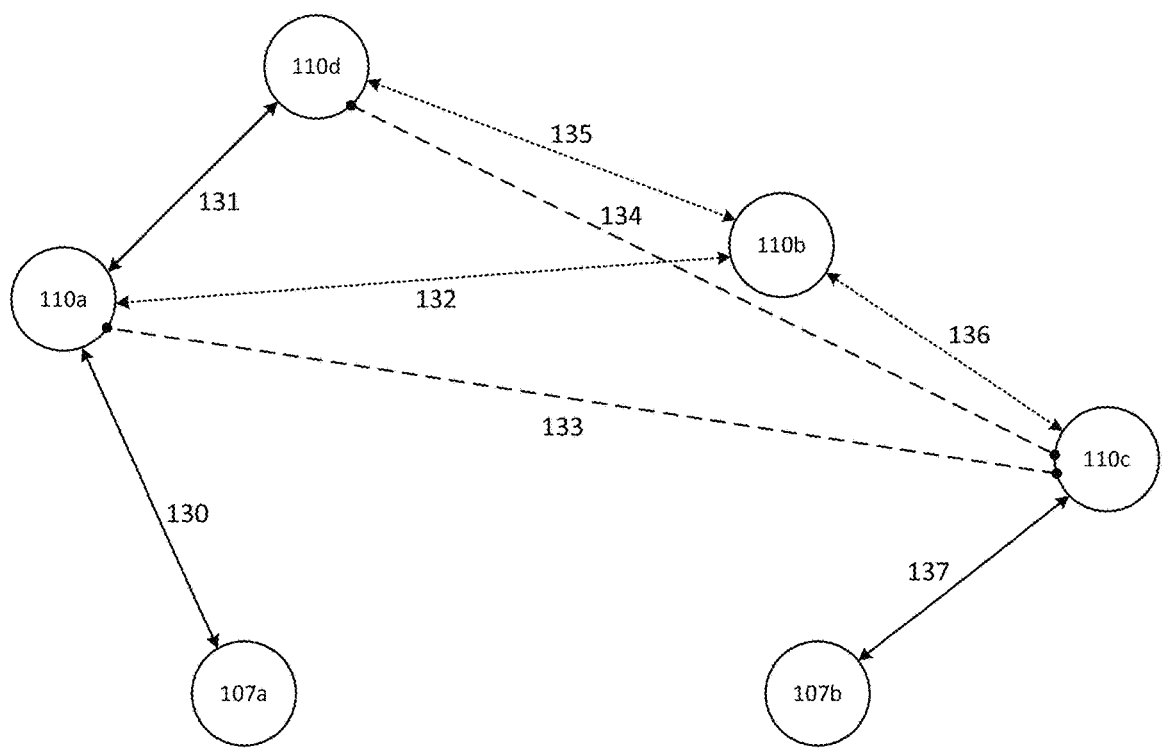
FIG. 6 is a functional diagram of a topology 600 of the network 100 shown in FIG. 1 in accordance with aspects of the disclosure.

At block 506, the one or more processors 310 may determine a current and/or future topology of the network based on the table using the topology determination module 328. For the example scenario, to determine the current topology, the one or more processors 310 may access the table in the memory 320 and determine from the table and the scheduled times associated with each node and link which nodes and links are available at the current time. According to the received information about HAPs 110a-110d, a current topology 600 may be determined as shown in FIG. 6. The current topology may be determined to include nodes 107, 110. Specifically, HAP 110a may be included in the current topology at location A, HAP 110c at location C, and HAP 110d at location D since these are the locations associated with the respective HAPs in the table for the current time. As shown by the arrows in the current topology 600, links 130-132 and 135-137 are included in the current topology, the link 133 between HAP 110a and 110c and the link 134 between HAP 110d and 110c, which are indicated as failed for the current time, are not included (shown as a dash-dot line without arrows in FIG. 6). In another example, if HAP 110c did not report its location at location C to one or more processors 310 but previously reported a flight path or a trajectory using the flight control module 334, the one or more processors 310 may determine that HAP 110c currently is at location C based on the flight path or trajectory and include HAP 100c in the current topology. Each possible link 130-132 and 135-137 in the current topology may also be labeled with link metrics, such as bandwidth, that are determined based on the received information. In the diagram of the current topology 600, solid lines indicate that links 130, 131, 134, 137 are capable of higher bandwidths, such as 3 Mbps or more, and dashed lines indicate that links 132, 135, 136 are capable of lower bandwidths, such as less than 3 Mbps.

Figure 7:
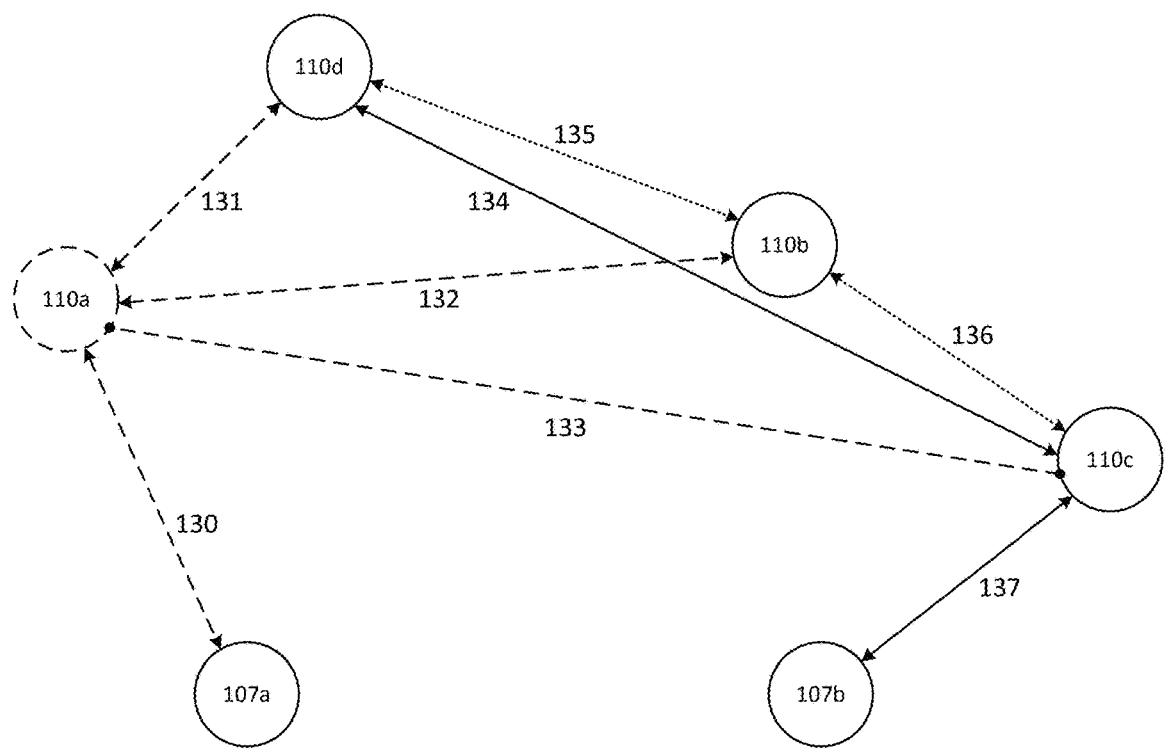
FIG. 7 is a functional diagram of another topology 700 of the network 100 shown in FIG. 1 in accordance with aspects of the disclosure.

Further in the example scenario, for a future time of one hour after the current time, a future topology 700 may be determined, as shown in FIG. 7. The one or more processors 310 may determine the location for HAP 110a at the future time to be location B and the location for HAP 110d at the future time to be location D based on the location information for the future time in the table. In addition, because the table includes an indication that the weather forecast includes a thunderstorm at location B as described above, the future topology may be determined to include HAP 110a at location B, but indicate that it is unavailable at least for FSOC. As shown in FIG. 7, the dash-dot outline of HAP 110a indicates that HAP 110a is unavailable in the future topology for the future time, and also shows links 130-133 in dash-dot lines to indicate that these links with HAP 100a may also be unavailable. As further shown in FIG. 7, the link 134 between HAP 110d and 110c may be established at the future time based at least in part on HAP 110d being in location D.

Returning to FIG. 5, at block 508, information related to client data to be transmitted through network 100 may be received by the one or more processors 310 using the scheduling module 336. The client data information may be received from client devices in communication with the network controller 300. The client data information may include an amount of data, a source location, and a destination location of the client data, and a requested time of transmission. For example, in the example scenario, the received information may indicate that the amount of client data is 10 Gb, the source location for client data is ground station 107a, the destination location is ground station 107b, and a requested time of transmission is the current time. In some cases, the information also includes transmission requirements, such as bandwidth, class of service, quality of service, etc. In some embodiments, information related to client data may be predicted by the one or more processors 310 of the network controller 300 or by a remote system.

At block 510, the one or more processors 310 may determine one or more flows for a current or future time using the current or future topology and the client data information using the flow determination module 330. In the case of the client data requesting transmission at the current time, one or more flows may be determined for the current time. The current topology may be retrieved from the table stored in memory 320. The one or more processors 310 in the example scenario may determine that the flow for the client data may be between ground station 107a and ground station 107b because the source location is connectable with ground station 107a and the destination location is connectable to ground station 107b, and both ground stations 107a and 107b are available according to the current topology. In addition, the bandwidth may be determined to be a minimum of 3 Gbps for the 10 Gb of client data. On the other hand, for 5 Gb of other client data, the minimum bandwidth requirement may be 1 Gbps. Alternatively, the minimum bandwidth requirement may be set by the client device. A time frame for the flow for the 10 Gb of client data may be determined to be 5 seconds, to ensure that the client data has time to be transmitted at a minimum rate of 3 Gbps.

In some implementations, the one or more processors 310 may aggregate client data from one or more client devices for transmission through the network. For example, the 10 Gb of client data previously mentioned may be aggregated with another 10 Gb of client data from the same or different client device to also be transmitted from ground station 107a to ground station 107b. Based on the total amount of 20 Gb of client data, the one or more processors 310 may determine that the flow between ground stations 107a and 107b may require a minimum bandwidth of 4 Gbps.

At block 512, the one or more processors 310 may generate a schedule of network configurations that includes a current network configuration for the current time and a future network configuration for the future time based on the determined flows and the current and future topology using the solver module 332. The schedule of network configurations may be determined to include a routing path that spans the current network configuration and the future network configuration. This type of routing path may be determined when a route between a pair of nodes does not exist in a single topology. For example, as shown in FIG. 6, no direct routing path between ground stations 107a and 107b for data requiring greater than 3 Gbps speeds is possible at the current time given the topology 600. Links 133 and 134 are unavailable, and links 132, 135, and 136 cannot support speeds greater than 3 Gbps. Also in FIG. 7, no direct routing path between ground stations 107a and 107b for data requiring greater than 3 Gbps speeds is possible at the current time given the topology 700. Links 130-133 are unavailable for FSOC.

Figure 8A:
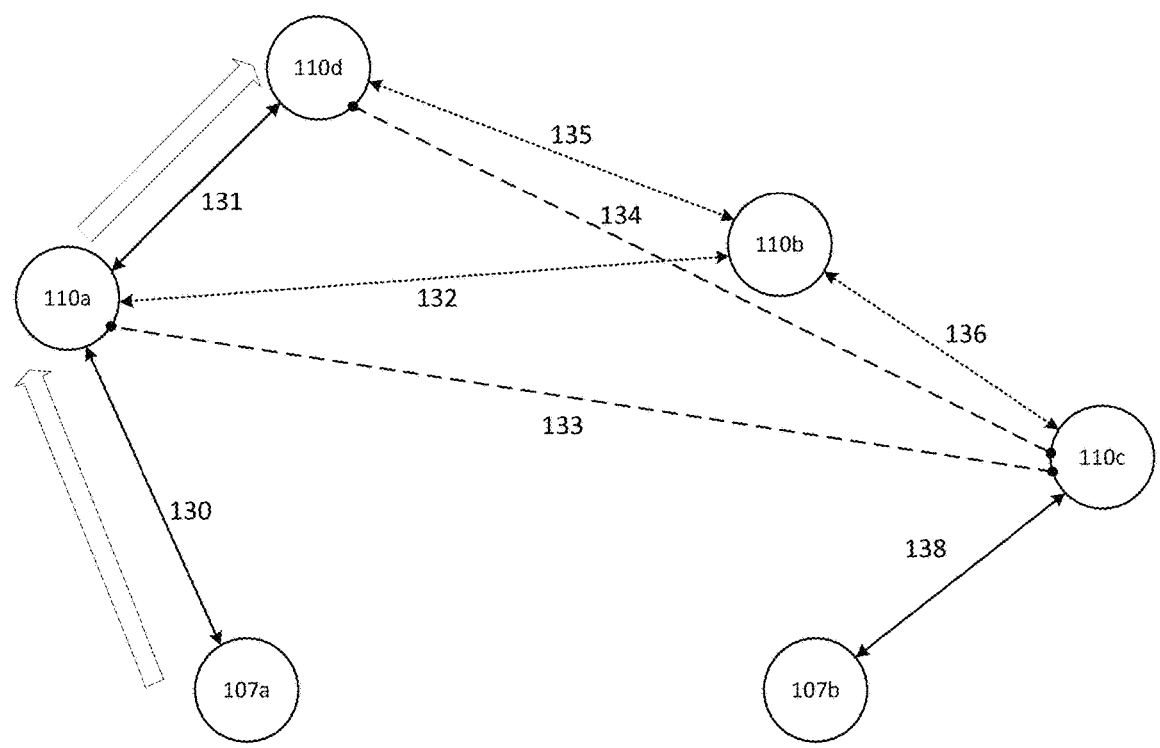
FIG. 8A is a functional diagram of a first part 800A of a routing path that may be implemented in the topology 600 shown in FIG. 6 in accordance with aspects of the disclosure.
Figure 8B:
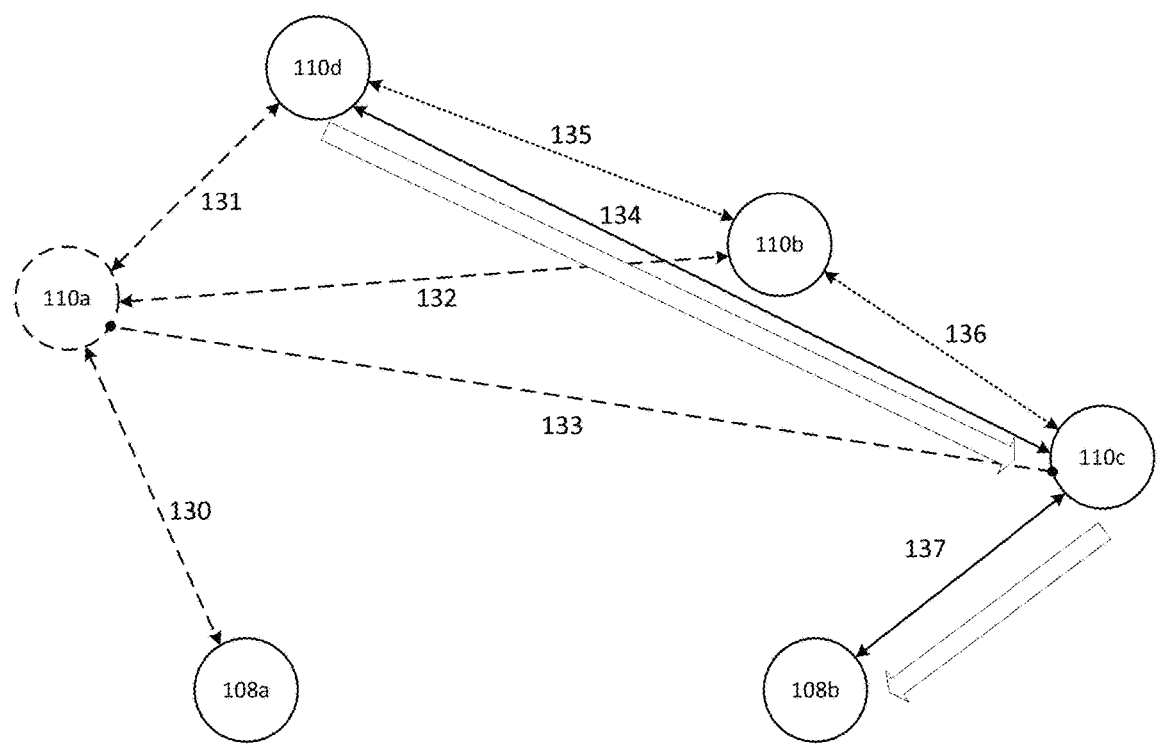
FIG. 8B is a functional diagram of a second part 800B of the routing path that may be implemented in topology 700 shown in FIG. 7 in accordance with aspects of the disclosure.

In this example scenario, the one or more processors 310 may determine the routing path of the schedule of network configurations to include a node to which data is transmitted and stored using the current network configuration and from which data is transmitted using the future network configuration. For example, the current network configuration and the future network configuration may be determined based on the flow between ground stations 107a and 107b, the current topology 600, the future topology 700, and the available storage at node 110d. The current network configuration may include a first portion or part 800A of a routing path as shown in FIG. 8A, and the future network configuration may include a second part 800B of the routing path as shown in FIG. 8B. The first part 800A of the routing path (shown in block arrows) may include two routing portions be from ground station 107a, through HAP 110a, to HAP 110d, using links 130 and 131. The first part 800A of the routing path ends at HAP 110d, where there is enough available storage, 10 Gb, to store the amount of client data received from the client device, 10 Gb. At the future time, HAP 110d may reach location D and be able to reestablish link 134 and complete the data transfer to destination ground station 107b. The second part 800B of the routing path (shown in block arrows) may be from HAP 110d, through HAP 110c, to ground station 107b, using links 134 and 137.

As further shown in FIG. 5, at block 514, the one or more processors 310 may send implementation instructions to the nodes 107, 110 of the network 100 for implementation of the generated network configuration and transmission of the client data using the topology and routing manager module 326 and/or the solver module 332. In the example scenario, for the current network configuration, the implementation instructions to nodes 107, 110 may include instructions to implement the routing path portions of first part 800A. The implementation instructions may therefore include instructions to ground station 107a to point a transceiver of ground station 107a towards HAP 110a to form link 130; instructions to HAP 110a to point transceivers of HAP 110a towards ground station 107a to form link 130 and towards HAP 110d to form link 131; and instructions to HAP 110d to point transceivers of HAP 110d towards HAP 110a to form link 131. In some embodiments, the implementation instructions may also prepare the network for the future network configuration. In this case, the implementation instructions may include instructions to HAP 110d to point transceivers towards where HAP 110c will be at the future time; instructions to HAP 110c to point transceivers of HAP 110c towards where HAP 110d will be at the future time and towards ground station 107b to form link 137; and instructions to ground station 107b to point a transceiver of ground station 107b towards HAP 110c to form link 137. In some cases, one or more of the links may already be formed, in which case no change to the direction of the transceivers is necessary. In addition, the implementation instructions to ground station 107a, the start station, may include routing instructions for receipt and transmission of the client data to be transmitted via routing path 800A-800B. The routing instructions may include the source location of the client data, the destination location of the client data, the timing for transmission, and/or the rate for transmission. When the routing instructions are received at ground station 107a, the ground station 107a may be caused to transmit client data at the current time through the current network configuration along routing path 800A-800B.

For a network configuration generated for a future point in time, the implementation instructions may include storing scheduled changes in the network 100, such as steering transceivers to implement new routing paths, at each node that may occur before transmitting client data at the future point in time. The implementation instructions may therefore include updating forwarding tables at each node with new routing paths and time or a time frame for implementing the new routing paths according to the future network configuration. When the time or time frame arrives, the nodes 107, 110 of network 100 may be caused to automatically implement the future network configuration according to the implementation instructions.

Alternatively, the one or more processors 310 of network controller 300 may request client data information from the one or more client devices 350 based on a plurality of available flows in the network 100 using the scheduling module 336. To do so, the one or more processors 310 may use the flow determination module 330 to determine a plurality of available flows between nodes directly connectable with client devices, such as ground stations 107a, 107b, based on the current or future topology. The plurality of available flows may alternatively be determined without receiving client data information and may include performance metrics for each flow. After determining the plurality of possible flows between nodes directly connectable with client devices, the one or more processors 310 may use the scheduling module 336 send a message to a first client device of the one or more client devices 350 via the communication system 340. The messages may include a list of available flows from the plurality of available flows that are between the node directly connectable to the first client device and all other nodes directly connectable to other client devices. In addition, the message may include a request for client data information for transmission through the network 100. A response may be received from the first client device including the client data information, which may then be used by the one or more processors 310 to generate and implement the network configuration using the solver module 332 as described above.

In another alternative embodiment, the client data information received at block 508 may not include a requested time for transmission or the requested time for transmission may not be feasible based on the topology of the network at the requested time. The one or more processors 310 of the network controller 300 may then determine a scheduled time for transmission for the client data using the scheduling module 336. The scheduled time may be determined based on the table representing all of the available nodes and possible links in the network 100 at a given time or time frame. For example, client data information may include a request to transmit 5 Gb of client data at the future time, one hour after the current time. Based on the source location and destination location in the client data information, the start station may be determined to be ground station 107a and the destination station may be determined to be ground station 107b. However, based on the future topology 700, shown in FIG. 7, HAP 110a is unavailable at the future time and therefore link 130 is also unavailable at the future time. Using the table stored in memory 320, the one or more processors 310 may then identify a second future time, which is the earliest time at which link 130 becomes available or a link between ground station 107a and another HAP, such as HAPs 110b-d, becomes available. The transmission of the 5 Gb of client data may then be scheduled to be at the second future time. The second future network configuration for the second future time may be generated to include a routing path between ground stations 107a and 107b. Alternatively, the second future network configuration may be updated to include the routing path between ground stations 107a and 107b if the second future network configuration was generated without the routing path.

The features described above may provide for a reliable way for users to transmit data to different parts of the world. A communication network created using the features described may provide users with network coverage that is more robust to fade and outages. Because of this, end users of the communication network are more likely to use the network because it may provide more reliable transmission of data. In addition, because of the mobility of the nodes end users may therefore have increased accessibility to datacenters and other points of interest worldwide.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system comprising:
a network controller configured to:
receive information regarding a plurality of nodes of a network, the received information including available storage at each node, the plurality of nodes including a first node that is in motion relative to a second node;
determine a series of topologies of the network based on the received information, the series of topologies being available over a period of time;
receive client data information from one or more remote devices, the client data information including a data amount;
generate one or more network configurations for the determined series of topologies based on at least the data amount and the available storage at each node; and
send instructions to the plurality of nodes of the network for implementing the one or more network configurations and transmitting client data over the period of time.

2. The system of claim 1, wherein the one or more network configurations includes a first network configuration, a second network configuration scheduled to follow the first network configuration, a first routing path having a first portion between a first node and a second node and a second portion between the second node and a third node, and the first portion of the first routing path being a part of the first network configuration and the second portion of the first routing path being a part of the second network configuration.

3. The system of claim 2, wherein the second node has enough available storage to store the data amount, and the second portion of the first routing path beings at the second node and the second node is configured to store the client data before transmitting the client data via the second portion of the routing path.

4. The system of claim 3, wherein the second network configuration includes a newly established link between the second node and a next hop in the second portion of the routing path.

5. The system of claim 4, wherein the second node is in motion relative to the next hop in the second portion of the routing path.

6. The system of claim 2, wherein the network controller is further configured to:
determine that there are no routes between the first node and the third node in each topology in the series of topologies; and
generate the one or more network configurations in response to determining that there are no routes between the first node and the third node in each topology in the series of topologies.

7. The system of claim 1, further comprising the plurality of nodes.

8. The system of claim 1, wherein the plurality of nodes includes one or more ground stations and one or more high-altitude platforms.

9. The system of claim 1, wherein the plurality of nodes is configured to perform free-space optical communication.

10. The system of claim 1, wherein the network controller is configured to generate the one or more network configurations for the determined series of topologies based on at least the data amount and the available storage at each node based on:
a given node having enough available storage to store the data amount; and
a routing path through the one or more network configurations including the given node in which the given node is used to store the client data for a second period of time.

11. A method comprising:
receiving, by a network controller for a network, information regarding a plurality of nodes of the network, the received information including available storage at each node, the plurality of nodes including a first node that is in motion relative to a second node;
determining, by the network controller, a series of topologies of the network based on the received information, the series of topologies being available over a period of time;
receiving, by the network controller, client data information from one or more remote devices, the client data information including a data amount;
generating, by the network controller, one or more network configurations for the determined series of topologies based on at least the data amount and the available storage at each node; and
sending, by the network controller, instructions to the plurality of nodes of the network for implementing the one or more network configurations and transmitting client data over the period of time.

12. The method of claim 11, wherein the one or more network configurations includes a first network configuration, a second network configuration scheduled to follow the first network configuration, a first routing path having a first portion between a first node and a second node and a second portion between the second node and a third node, the first portion of the first routing path being a part of the first network configuration and the second portion of the routing path being a part of the second network configuration.

13. The method of claim 12, wherein the second node has enough available storage to store the data amount, and the second portion of the first routing path beings at the second node, and the second node is configured to store the client data before transmitting the client data via the second portion of the routing path.

14. The method of claim 13, wherein the second network configuration includes a newly established link between the second node and a next hop in the second portion of the routing path.

15. The method of claim 14, wherein the second node is in motion relative to the next hop in the second portion of the routing path.

16. The method of claim 12, further comprising:
determining, by the network controller, that there are no routes between the first node and the third node in each topology in the series of topologies; and
generating, by the network controller, the one or more network configurations in response to determining that there are no routes between the first node and the third node in each topology in the series of topologies.

17. The method of claim 11, wherein generating the one or more network configurations for the determined series of topologies based on at least the data amount and the available storage at each node includes:
identifying a given node having enough available storage to store the data amount; and
determining a routing path through the one or more network configurations including the given node in which the given node is used to store the client data for a second period of time.

18. A non-transitory, tangible computer-readable storage medium on which computer readable instructions of a program are stored, the instructions, when executed by a network controller for a network, cause the network controller to perform a method, the method comprising:
receiving information regarding a plurality of nodes of the network, the received information including available storage at each node, the plurality of nodes including a first node that is in motion relative to a second node;
determining a series of topologies of the network based on the received information, the series of topologies being available over a period of time;
receiving client data information from one or more remote devices, the client data information including a data amount;
generating one or more network configurations for the determined series of topologies based on at least the data amount and the available storage at each node; and
sending instructions to the plurality of nodes of the network for implementing the one or more network configurations and transmitting client data over the period of time.

19. The medium of claim 18, wherein the one or more network configurations includes a first network configuration, a second network configuration scheduled to follow the first network configuration, a first routing path having a first portion between a first node and a second node and a second portion between the second node and a third node, the first portion of the first routing path being a part of the first network configuration and the second portion of the routing path being a part of the second network configuration.

20. The medium of claim 19, wherein the second node has enough available storage to store the data amount, and the second portion of the first routing path beings at the second node, and the second node is configured to store the client data before transmitting the client data via the second portion of the first routing path.

* * * * *

UNITED STATES PATENT AND TRADEMARK OFFICE
CERTIFICATE OF CORRECTION

Page 1 of 1

PATENT NO. : 10,879,999 B2
APPLICATION NO. : 16/444620
DATED : December 29, 2020
INVENTOR(S) : Brian Barritt It is certified that error appears in the above-identified patent and that said Letters Patent is hereby corrected as shown below:

In the Claims

Claim 3, Column 18, Line 63:
Now reads: "the routing path" should read -- the first routing path --

Claim 4, Column 18, Line 67:
Now reads: "the routing path" should read -- the first routing path --

Claim 5, Column 19, Line 3:
Now reads: "the routing path" should read -- the first routing path --

Claim 12, Column 19, Lines 59 and 60:
Now reads: "the routing path" should read -- the first routing path --

Claim 13, Column 19, Line 66:
Now reads: "the routing path" should read -- the first routing path --

Claim 14, Column 20, Line 4:
Now reads: "the routing path" should read -- the first routing path --

Claim 15, Column 20, Line 7:
Now reads: "the routing path" should read -- the first routing path --

Claim 19, Column 20, Lines 58-59:
Now reads: "the routing path" should read -- the first routing path --

Claim 20, Column 20, Line 62:
Now reads: "beings" should read -- being --

Signed and Sealed this
Twelfth Day of April, 2022

Drew Hirshfeld
*Performing the Functions and Duties of the
Under Secretary of Commerce for Intellectual Property and
Director of the United States Patent and Trademark Office*